Patented May 19, 1942

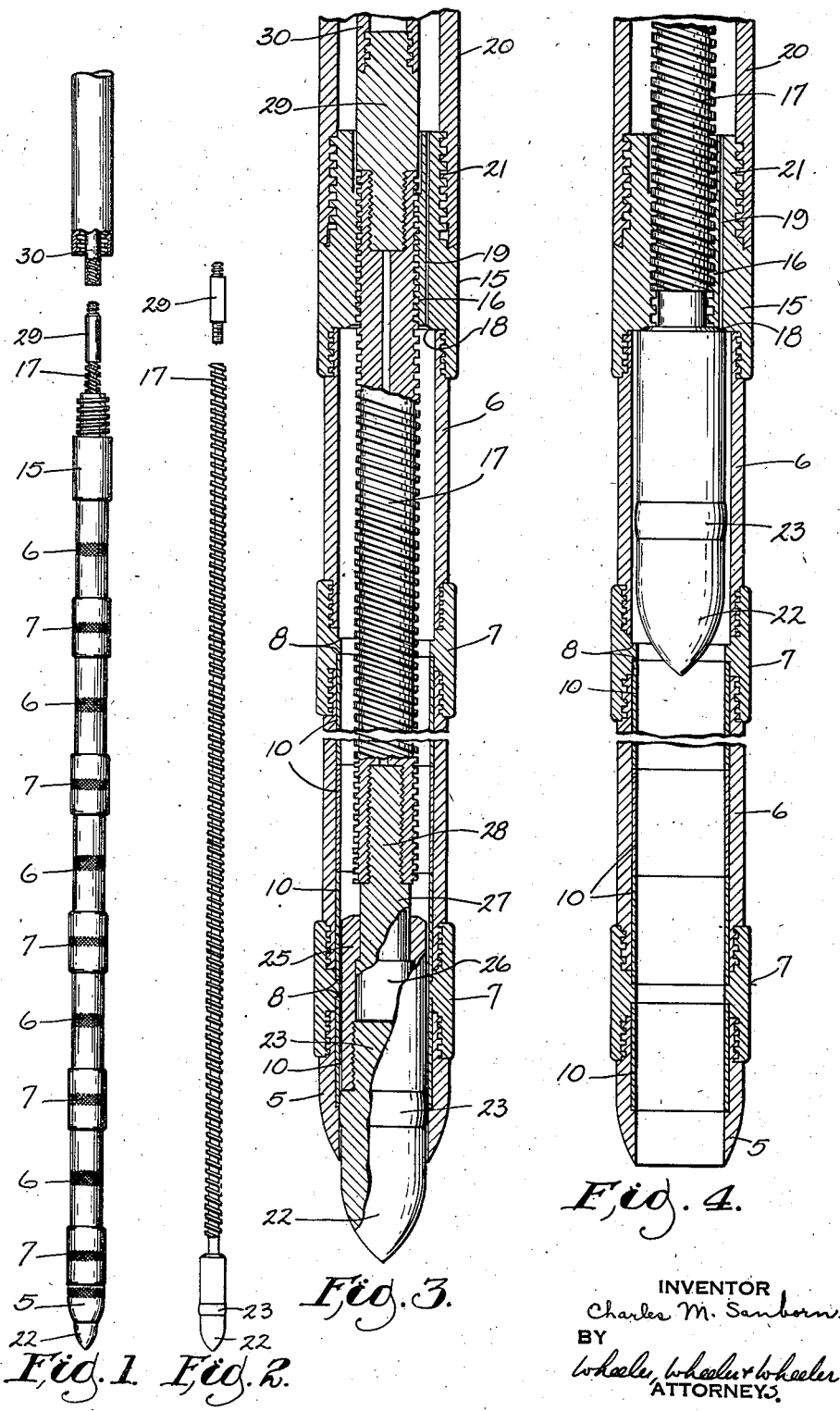

2,283,650

UNITED STATES PATENT OFFICE 2,283,650

EARTH SAMPLING EQUIPMENT

Charles M. Sanborn, Clintonville, Wis., assignor to Four Wheel Drive Auto Company, Clintonville, Wis., a corporation of Wisconsin Application March 6, 1940, Serial No. 322,488

1 Claim. (Cl. 255—1.4)

This invention relates to improvements in earth sampling equipment.

It is the primary object of the invention to provide an earth sampling tube with removable inner core shells and a point retractible through such shells to a seat which closes an air vent, thus enabling the sealing of the contents of the sampling point under partial vacuum to retain such contents in the core shells during withdrawal of the point.

Other objects of the invention will be apparent to those skilled in the art upon study of the following disclosure.

In the drawing:

Figure 1 is a side elevation of a soil sampling device, partially broken away to expose the interior construction.

Figure 2 is a view in elevation of the driving point or plug and its retracting screw.

Figure 3 is a view in axial section on an enlarged scale, fragmentarily illustrating the mechanism shown in Figure 1 with the plug in its advanced or driving position.

Figure 4 is a view similar to Figure 3 showing the plug in its retracted or lifting position.

Like parts are identified by the same reference characters throughout the several views.

The sampling tube, which, in actual practice, is somewhat more than four feet long comprises an annular cutting tip 5 and a series of sections 6 connected by couplings 7. The couplings 7 are preferably internally shouldered to provide seats against which the ends of the sections 6 abut. Other shoulders at 8 receive the removable core sleeves 10, about three of which are preferably employed in each of the sections 6. When the sections are uncoupled from the couplers 7 the sleeves 10 are exposed for ready withdrawal with the samples of soil which are therein contained, as will hereinafter be explained.

At the upper end of the sampling tube is a special coupler 15 which comprises a nut section. At its lower end the nut section 15 has internal threads like the threads of the other couplers to engage the final section 6 in which, incidentally, no removable core sleeves 10 are inserted. Another set of threads 16 on a much smaller radius meshes with the threads of the retracting screw 17, which is illustrated in Figure 2. The threads of screw 17 and the complementary threads 16 of the nut 15 are preferably double threads of relatively high pitch to speed up the retracting action, while providing ample thrust bearing surface to withstand the driving strains.

Within the lower threaded end of the nut section 15 is a bevelled seat at 18, comparable to a valve seat, and from a point within the bearing surface of this seat a vent duct 19 leads upwardly through the nut section, providing the only communication from one end of the nut section to the other when the screw 17 is threaded into the nut section.

A heavy tubular rod 20, which may conveniently be made up in ten foot lengths, has internal threads whereby it is connected to the threaded tubular upward extension 21 of the nut section. The driving hammer is not illustrated but any conventional well driving hammer may be used at the upper end of the tubular rod 20 to drive the device into the earth.

During the initial driving operation, while the apparatus is being forced into the ground toward the level at which a sample is desired, the driving point or plug 22 projects from the cutting point 5 in the manner illustrated in Figures 1 and 3. The apex of the driving point or plug has convex surfaces of generally conical form, which, in a general way, constitute extensions of the convex outer surfaces of the cutting point 5. The driving point, however, is slightly smaller in its exterior diameter than the internal diameter of the cutting point except at the level where a spherically surfaced band 23 on the driving point 22 fits snugly into the internal bore of the cutting point and into the bores of the successive core sleeves 10. Internally the cutting point 5 is counter-bored and shouldered to receive the lowermost of these core sleeves, as best shown in Figure 3.

Above the sealing band 23 of the driving point 22 the driving point is provided with a threaded stem portion 24, engaged by the annular nut 25 which holds to the core point the swivel head 26 of an adapter 27, the reduced end portion 28 of which is screwed into the lower end of the retracting screw 17. The thread used is preferably a left-hand thread so as to remain tight when screw 17 is being operated in a retracting direction.

At the upper end of screw 17 the adapter 29 connects the screw with a rod 30 of the type used for rotating a tool, the rod 30 being preferably made up in five foot lengths and extending through the tubular rod 20 to the surface of the ground, where it may be rotated by a wrench or otherwise in a direction to retract the plug or driving point 22.

In operation, the tool, assembled in the manner shown in Figures 1 and 3, is driven into the earth to the desired depth. The cutting edge of the annular cutting point 5 is protected, and the driving shock during this part of the operation is sustained by the plug or driving point 22. The band 23 seals the sampling core sleeves against penetration of earth during this part of the operation.

As the driving proceeds additional sections 20 of the driving rod are added as required, and at the same time additional sections 30 of the rotating rod are likewise added as required.

When a depth is reached at which a sample is desired the driving operation is suspended and the rod 30 is rotated to turn screw 17 in nut 15 for the retraction of the plug or driving point 22. The sealing band 23 moves smoothly through the cutting point, the several core sleeves 10 and the intervening surfaces of the couplers 7 until the driving point reaches the uppermost section 6, wherein there are no core sleeves. It is stopped short of the seat at 18, and inasmuch as the band 23 is of smaller diameter than the interior of this final section 6, the hole of the sampling tube assembly is now vented through the duct 19.

Driving is now resumed, and the annular cutting edge of the cutting point 5 now cuts a core from the soil and the core enters into the assembly and the successive core sections therein. Since the interior diameters of the core sections are identical with the interior diameter of the cutting point, the core of soil isolated by the cutting point from the surrounding earth will fit snugly into the separable sleeves 10.

When the device has been driven to such a depth as completely to fill the several removable core sleeves 10, the driving is again interrupted and the plug 22 is retracted for an additional distance sufficient to seat it firmly against the seat 18 in the manner shown in Figure 4, thus cutting off the vent 19 through which air has escaped from the apparatus during the penetration of the core. With the plug firmly seated over the end of the vent passage 19 it is no longer possible for air to move downwardly through the device to relieve the vacuum which would exist in the event that the core tended to withdraw from the apparatus. Consequently the external pressure working against this potential vacuum tends to keep the core firmly seated in the removable core sleeves. The entire apparatus is then withdrawn from the earth, lifting the core with it, and as the sampling tube reaches the surface of the ground its successive sections are unscrewed from the couplings 7 and the individually removable core sleeves are withdrawn, each with its content of earth, to indicate the nature of the soil at the particular depth at which the sample was taken.

As compared with any other method of venting the sampling tube, as for example through the interior of the screw 17, the arrangement disclosed is greatly to be preferred, inasmuch as it does not involve any weakening of the screw such as inevitably results from any attempt to bore radial holes in the screw.

I claim:

A soil sampling device comprising the combination with a case made up of sampler sections and intervening couplings, certain of said sections other than the uppermost section of said case being provided with liner sleeves and the lowermost of said sections comprising a cutting point, a driving point comprising a plug fitting within the cutting point and the successive liner sleeves, a screw connected with said plug, a nut connected to said case at its upper end and in threaded connection with the screw for the retraction of said plug, complementary seating means on the nut and the plug engageable upon the complete retraction of the plug, and vent means through the nut laterally offset from the screw and opening within the area of said complementary seating means to be sealed thereby when the plug is completely retracted.

CHARLES M. SANBORN.